United States Patent [19]

Ivarsson et al.

[11] 3,982,953

[45] Sept. 28, 1976

[54] REFRACTORY CASTING, RAMMING OR STAMPING MASS

[75] Inventors: Paul Lennart Ivarsson, Hoganas; Ingvar Gustav Axel Blom, Viken, both of Sweden

[73] Assignee: Hoganas Aktiebolag, Hoganas, Sweden

[22] Filed: Nov. 7, 1974

[21] Appl. No.: 521,874

[30] Foreign Application Priority Data

Nov. 26, 1973 Sweden................................ 7315942

[52] U.S. Cl................................ 106/55; 106/64; 106/65; 106/67
[51] Int. Cl.² ................... C04B 35/02; C04B 35/10
[58] Field of Search .................. 106/41, 65, 93, 99, 106/64, 67, 55

[56] References Cited
UNITED STATES PATENTS

| 426,643 | 4/1890 | Lenderoth ............................ 106/41 |
|---|---|---|
| 1,345,632 | 7/1920 | Purdy et al. ......................... 106/41 |
| 1,580,906 | 4/1926 | Korber et al.......................... 106/41 |
| 2,012,798 | 8/1935 | Whittier.............................. 106/41 |
| 2,224,459 | 12/1940 | Matheny.............................. 106/41 |

*Primary Examiner*—J. Poer
*Attorney, Agent, or Firm*—Toren, McGeady and Stanger

[57] ABSTRACT

This invention relates to a refractory mass of the art known per se for casting, ramming or stamping refractory linings and for metallurgical ladles or tapping channels, based on refractory grog and binder, to which mass there has been added straw-shaped, channel-forming elements, equally distributed throughout the mass, in sufficient amount to make possible rapid-drying.

7 Claims, No Drawings

REFRACTORY CASTING, RAMMING OR STAMPING MASS

One of the heavy cost items for industrial furnaces with refractory linings relates to shut down periods for repair or renewal of the refractory lining. The bigger the furnace and the longer the shut down period required for a repair, the bigger the fall off in production and thereby the furnace cost or the loss.

Due to these conditions there is a constant and increasing interest in using such refractory linings which demand the shortest possible time for preparation and repair. The least time-consuming methods for lining a furnace are casting, ramming or stamping with refractory masses. Such masses comprise refractory grains as fillers (so called grog), binder, and water to impart to the mass a fluidity, or plasticity suitable for casting, ramming or stamping. The grog usually consists of grains of refractory materials, such as, corundum, bauxite or kaolin, while calcium aluminate cement, phosphoric acid or a phosphate, silicate cement or colloidal silica are preferably used as binders.

Generally such masses now available on the market as a rule have a composition of 60 to 95 per cent by weight refractory filler (grog) and 40 to 5 per cent by weight of binder (clays, cements, phosphoric acid etc). To these components an appropriate amount of water is added, in the case of ramming, a lining of about 5 per cent of the weight of filler + binder and in the case of casting, a lining about 10 per cent of the weight of filler + binder.

Even if these masses can be rapidly cast, rammed or stamped to form refractory linings, they generally require a relatively time-consuming drying to evaporate the water before a furnace or the like lined in this way can be put into use. The reason for this is that at rapid-drying, i.e., subjecting the lining to high temperatures immediately after preparation, the evaporation takes place so rapidly that the mass will crack or even burst to pieces. In certain trials these disadvantages have been avoided by forming channels in the linings to facilitate the escape of the vapour formed by the rapid drying. These channels have been formed by inserting iron or steel wires through a plurality of holes in the wall of the mould and withdrawing said wires again after the mass has partially hardened while leaving evaporation channels. This chanelling work has to be carried out by hand and, consequently, it becomes time-consuming and expensive which increases the costs caused by longer shut down periods for the furnaces. The inventors have asked themselves whether it would not be possible to create, in a more simple way, evaporation channels in the cast, rammed or stamped linings referred to in order to facilitate the escape of water at rapid-drying, so as to avoid the disadvantages referred to above.

According to the present invention, this problem has been solved in a very simple and effective way by using quite another type of channel-forming elements, namely straw-shaped channel-forming elements, which can be homogeneously mixed into the refractory mass to be used for casting, ramming, stamping or the like, and which automatically provide evaporation channels. Preferable channel-forming elements or materials are straws or stalks of common cereals, grass, reed or similar natural materials. Straw-shaped synthetic elements, e.g., made from paper, plastic or other organic materials containing suitable ashforming constituents can, however, also be used. During the rapid-drying process these materials are partially or completely removed by combustion.

The channel-forming material should preferably be cut or chopped in such lengths which can be easily and equally intermixed with the refractory mass in the mixers commonly used in the ceramic industry. For this reason it has been found preferable not to use greater lengths than about 6 cm. Thus, greater lengths can cause some trouble in the mixing operation with regard to desired equal distribution of the channels throughout the mass. As the purpose of the invention is to form channels and not only common pores, the cut lengths should not be too short; consequently there is no reason to cut the straw-chaped elements in lengths below 1 cm. A preferable length is about 2 cm. In this connection it should also be observed that an increase of the porosity of the mass, e.g. by intermixing common pore-forming materials, such as, saw-dust, does not counteract bursting during rapid-drying. This fact also speaks against too short pieces of channel-forming elements.

As concerns the amount of channel-forming elements which is required to avoid bursting or explosion during rapid-drying, good results have been obtained with from 0.05 to 0.35 per cent by weight of channel-forming elements, based on the weight of the mass to which the elements are added, the amount being calculated on the solids, which corresponds to from 50 to 350 g of dry straw-element to 100 kg, calculated as solids, of the refractory mass. For safety's sake, the lower limit of the addition of the straw-element should not be lower than 0.1 per cent by weight, and higher percentages than 0.25 per cent by weight are generally not necessary. For practical reasons, including avoiding unnecessary porosity which could impair the strength and slag resistance of the lining it is preferable to use 0.1 - 0.25 per cent by weight of straws, preferably from wheat, having a length of about 2 cm. In this connection, it should be noted that an air dry wheat straw cut to a length of 2 cm has a volume weight, in loose (unpacked) condition, of about 28 g/l.

EXAMPLE 1.

A common refractory casting mass comprising 75 per cent by weight of corundum as grog and 25 per cent by weight of calcium aluminate cement as binder was divided into two equal portions. One of these portions was used as such, whereas the other one was intermixed with 0.2 % by weight based on the weight of grog + binder, or air dry wheat straw cut to a length of about 2 cm. From each of these two masses, to which 9 % of water, based on the weight of the mass, was added, blocks were made having the dimensions 68 × 48 × 23 cm. These blocks were fitted in two walls of a panel spalling test preheat furnace (ASTM), one of the walls thus consisting of blocks containing chopped straw and the other one of blocks without any straw. The walls were then rapid-dried by means of firing with oil burners. After about one half hour, when the furnace temperature had increased to about 500°C, an explosion occurred, the wall without any straw busting to pieces. The firing was then interrupted and the furnace was inspected, which inspection showed that the walls made of chopped straw containing blocks were completely intact.

The experiment was repeated while lining the furnace solely with the chopped straw containing blocks and rapid-drying with the same rate up to 1000°C without any visible crack or damage of the blocks. The strength of the blocks which had been rapid-dried up to 1000°C was the same as that of comparative blocks without any chopped straw which had been dried at a slower rate up to 1000°C to avoid cracking.

For comparison blocks were made from the same refractory mass with a corresponding per cent by volume of dry saw dust (which meant 0.7 % by weight) instead of the chopped straw. Even in this case an explosive bursting occurred during the same type of rapid drying.

The experiment was also repeated while replacing the chopped wheat straw with 0.2 % by weight of cut pieces of plastics sipper straw having a length of about 2 cm. This material had the same good effect on the rapid-drying process as the chopped wheat but is of minor interest due to the present high price.

EXAMPLE 2.

A block having a weight of 300 kg was rammed from a mass consisting of 95 % by weight of high alumina grog and 5 % by weight of bonding clay, to which there was added the common addition of 7 % by weight of phosphoric acid (80 %) and 5 % by weight of water. This block was dried up to 300°C. In order to avoid cracking of the block, the heating up to 300°C was carried out during a period of 48 hours. Blocks were then made of the same size and from the same mass with the addition of 0.2 % by weight of chopped wheat straw having a length of about 2 cm, calculated on the weight of the dry materials before the addition of straw. These blocks could be dried up to the same temperature in 12 hours without any cracking. Such rapid drying of the first block resulted in explosive cracking.

EXAMPLE 3.

A test series was run while using the refractory mass from Example 1, to which there were added 0.25 % by weight, based on the weight of grog and binder, of chopped wheat straws having lengths of 1, 2, 3, 4.5, and 6 cm respectively.

Blocks prepared from these masses were rapid-dried as in Example 1 but in a small test furnace. The firings were interrupted at 900°–1000°C, after which firings, the blocks were completely intact.

As in Example 1 the experiment was repeated while using dry saw dust, which resulted in an explosive bursting during the rapid-drying.

The inventive idea disclosed above is, of course, generally applicable to lining with water containing refractory masses by casting, ramming and stamping, etc. when following rapid-drying is to be applied. Such fields of use are tapping or casting channels in connection with melting furnaces, e.g., blast-furnaces, or ladles for pig iron melts where the supplying of the hot metal can bring about bursting. Also in these cases, channel-forming elements in the refractory mass can facilitate the escape of any remaining water in the vapour state so as to avoid blowing up of the lining.

What is claimed is:

1. In a refractory mass of the type used for casting, ramming or stamping refractory linings and for metallurgical ladles or tapping channels and composed of 60 to 95 % by weight of refractory grog and 40 to 5 % by weight of binder, the improvement which comprises said mass further containing 0.05 to 0.35 % by weight, based on the solids content of the mass without any additive, of straw-shaped, channel-forming elements equally distributed throughout the mass, whereby rapid drying of the mass is made possible.

2. In a refractory mass of the type used for casting, ramming, or stamping refractory linings and for metallurgical ladles or tapping channels and composed of 60 to 95 % by weight of refractory grog and 40 to 5 % by weight of binder, the improvement which comprises said mass further containing 0.05 to 0.35 % by weight, based on the solids content of the mass without any additive, of straw-shaped, channel-forming elements having a length within the range of 1–6 cm, said elements equally distributed throughout the mass, whereby rapid drying is made possible.

3. The refractory mass of claim 2, wherein the amount of channel-forming elements is 0.1 to 0.25 % by weight.

4. The refractory mass of claim 2, wherein the channel-forming elements are cut straws of common cereals.

5. The refractory mass of claim 4, wherein the channel-forming elements consist of about 0.1 to about 0.25 % by weight of chopped wheat straw having a length of about 2 cm.

6. The refractory mass of claim 5, composed of 75 % by weight of corundum as the grog, 25 % by weight of calcium aluminate cement as the binder, and 0.2 % by weight, base on the combined weight of grog and binder of wheat straw chopped to a length of about 2 cm.

7. The refractory mass of claim 5, composed of 95 % by weight of high alumina grog, 5 % by weight of bonding clay, 7 % by weight of 80 % phosphoric acid as a binder, and 0.2 % by weight of wheat straw chopped to a length of about 2 cm, all weights being based on the combined weight of alumina grog and bonding clay.

* * * * *